US012423921B2

(12) United States Patent
Woo et al.

(10) Patent No.: US 12,423,921 B2
(45) Date of Patent: Sep. 23, 2025

(54) AUGMENTED REALITY (AR) SHARE SYSTEM

(71) Applicant: RESEARCH & BUSINESS FOUNDATION SUNGKYUNKWAN UNIVERSITY, Suwon-si (KR)

(72) Inventors: Hong Uk Woo, Suwon-si (KR); Yun Ho Kim, Suwon-si (KR); Won Je Choi, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 175 days.

(21) Appl. No.: 17/954,568

(22) Filed: Sep. 28, 2022

(65) Prior Publication Data

US 2023/0098869 A1    Mar. 30, 2023

(30) Foreign Application Priority Data

Sep. 28, 2021    (KR) ........................ 10-2021-0127914

(51) Int. Cl.
*G06T 19/00*    (2011.01)
*H04L 67/131*    (2022.01)

(52) U.S. Cl.
CPC .......... *G06T 19/006* (2013.01); *H04L 67/131* (2022.05)

(58) Field of Classification Search
None
See application file for complete search history.

(56) References Cited

U.S. PATENT DOCUMENTS

| 2019/0025850 A1* | 1/2019 | Park | A47L 9/2852 |
| 2019/0180486 A1* | 6/2019 | Wu | G06T 11/00 |
| 2021/0383580 A1* | 12/2021 | Jin | G06V 20/20 |
| 2022/0262077 A1* | 8/2022 | Kim | H04L 67/52 |

FOREIGN PATENT DOCUMENTS

| KR | 10-2015-0126938 A | 11/2015 |
| WO | WO 2014/164901 A1 | 10/2014 |

OTHER PUBLICATIONS

Liu et al. (PlaneRCNN: 3D Plane Detection and Reconstruction from a Single Image, IEEE, 2019) (Year: 2019).*
Korean Office Action issued on Aug. 8, 2022 in counterpart Korean Patent Application No. 10-2021-0127914 (3 pages in English).
Korean Office Action issued on Aug. 8, 2022 in counterpart Korean Patent Application No. 10-2021-0127914 (4 pages in Korean).

* cited by examiner

*Primary Examiner* — Kyle Zhai
(74) *Attorney, Agent, or Firm* — NSIP Law

(57) ABSTRACT

An augmented reality (AR) share system includes a device configured to select a predetermined number of specific frames, among a plurality of frames used for a registration process of a cloud anchor; and a server configured to receive the predetermined number of specific frames, and generate an auxiliary plane anchor defining a position of a virtual object based on the predetermined number of specific frames.

5 Claims, 3 Drawing Sheets

AUGMENTED REALITY (AR) SHARE SYSTEM

CROSS-REFERENCE TO RELATED APPLICATIONS

This application claims the benefit under 35 USC 119(a) of Korean Patent Application No. 2021-0127914 filed on Sep. 28, 2021, in the Korean Intellectual Property Office, the entire disclosure of which is incorporated herein by reference for all purposes.

BACKGROUND

1. Field

The present disclosure relates to an AR share system.

2. Description of the Related Art

Virtual reality (VR) refers to an environment or situation generated by man-made technology using computers, and the like, which is similar but not exactly equal to the real world, or the technology itself.

Augmented reality (AR) is the technology that makes a virtual object or information interwoven with the real world, making the virtual object or information perceived as if it exists in reality.

Mixed reality (MR) or hybrid reality refers to combining the real world with a virtual one, generating a new environment or new information. Mixed reality refers to the experience of physical and virtual objects interacting in real time.

The created virtual environment or situation may stimulate a user's five senses, allowing the user to have a spatial-temporal experience similar to the one perceived in the real world, thereby allowing the user to cross the boundary between reality and imagination freely. Also, the user may not only get immersed in such an environment but also interact with objects implemented in the environment by manipulating or giving a command to the objects through an actual device.

Research into the gear specialized in the technical field above has been conducted recently. Specifically, efforts to share augmented reality information between various users are being continued.

Generally, the AR share system requires a device's position and a virtual object's position. Finding out a 3D coordinate and direction information of the virtual object limits a position of a sharable virtual object due to a performance limit of simultaneous localization and mapping (SLAM).

In order to share the virtual object, the corresponding object's position information (coordinate and direction) may be desired.

Since it is expensive for a host to acquire the information with a separate measurement means directly, information inferred from SLAM may be utilized.

However, the SLAM does not have position information about a region that is not visited, so it has a spatial restriction. Specifically, the SLAM used for the AR system of a mobile terminal is an image-based SLAM, so a recognizable range is limited.

Such problems make it difficult to share the virtual object in an outdoor environment with a wide field of view.

Recently, although it is possible to solve the spatial restriction of the SLAM by utilizing a deep neural network, there is a restriction in the resource due to the characteristic of the mobile terminal environment. Further, when the deep neural network is used for the mobile, it may degrade the quality of service (QoS) so that studies are carried out to solve the problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an augmented reality (AR) share system includes a device configured to select a predetermined number of specific frames, among a plurality of frames used for a registration process of a cloud anchor; and a server configured to receive the predetermined number of specific frames, and generate an auxiliary plane anchor defining a position of a virtual object based on the predetermined number of specific frames.

The device may further include an AR system configured to register a position of the cloud anchor for coordinate synchronization of the virtual object; and an image selector configured to extract frames more than a number of set reference feature points, among the plurality of frames, based on feature point information set in the AR system, and select the predetermined number of specific frames with a feature point minimum ratio overlapping between the frames, among the frames, which is higher than a set reference ratio.

When the predetermined number of specific frames is transmitted, the image selector may be further configured to transmit a cloud anchor pose of each of the predetermined number of specific frames and a cloud anchor ID to the server.

The server may include a database and a plane detector configured to generate and store the auxiliary plane anchor in the database based on the predetermined number of specific frames, the cloud anchor pose, and the cloud anchor ID.

The plane detector may be further configured to infer plane information for each frame in the predetermined number of specific frames, and replace a relationship with the cloud anchor with the cloud anchor pose.

In another general aspect, an (augmented reality) AR share system includes one or more processors and a server. The one or more processors are configured to: select a predetermined number of specific frames, among a plurality of frames used for a registration process of a cloud anchor; register a position of the cloud anchor for coordinate synchronization of the virtual object; and extract frames more than a number of set reference feature points, among the plurality of frames, based on feature point information set in the AR system, and select the predetermined number of specific frames with a feature point minimum ratio overlapping between the frames, among the frames, which is higher than a set reference ratio. The server is configured to receive the predetermined number of specific frames, and generate an auxiliary plane anchor defining a position of a virtual object based on the predetermined number of specific frames.

The AR share system may further include a memory configured to store instructions. The one or more processors may be further configured to execute the instructions to configure the one or more processors to select the predetermined number of specific frames, register the position of the cloud anchor for coordinate synchronization of the virtual object, and extract the frames and select the predetermined number of specific frames.

The one or more processors may include an AR system is configured to register the position of the cloud anchor for the coordinate synchronization of the virtual object, and an image selector is configured to extract the frames more than the number of set reference feature points, and select the predetermined number of specific frames with the feature point minimum ratio overlapping between the frames.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
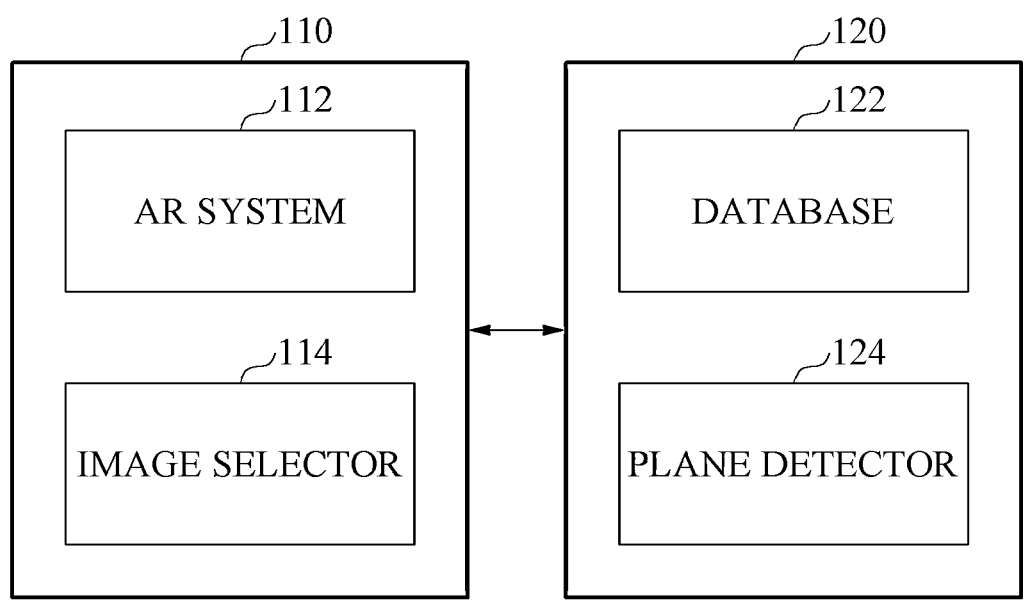
FIG. 1 is a control block diagram illustrating a control configuration of an AR share system according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a control block diagram illustrating a control configuration of an AR share system according to an embodiment of the present disclosure.

Referring to FIG. 1, an AR share system 100 may include a device 110 and a server 120.

The device 110 may include an AR system 112 and an image selector 114.

Generally, a mobile terminal's AR share system employs positioning a cloud anchor and using a visual cue generated by capturing the cloud anchor at various angles to synchronize an AR coordinate system.

However, according to the corresponding method, the distance between the device and a virtual object is limited so that when a plurality of virtual objects is shared, the same procedure may share the position information of all the objects.

First, the AR system 112 may register a position of a cloud anchor for coordinate synchronization of the virtual object using ARCore, and the coordinate system synchronization may use the cloud anchor API.

The image selector 114 may extract frames more than a number of set reference feature points, among a plurality of frames used for a registration process of a cloud anchor, based on feature point information set in the AR system 112 and select a predetermined number of specific frames with a minimum ratio of feature points overlapping between frames, among the frames, which is higher than a set reference ratio.

Here, the number of reference feature points and the minimum ratio may be references for selecting images used for the AR system 112 to generate virtual objects, but are not limited thereto.

Further, when a predetermined number of specific frames is transmitted, the image selector 114 may transmit a cloud anchor pose of each predetermined number of specific frames and a cloud anchor ID to the server 120.

The server 120 may include a database 122 and a plane detector 124.

The database 122 may store the auxiliary plane anchor generated based on the predetermined number of specific frames, the cloud anchor pose, and the cloud anchor ID.

Further, the database 122 may store the cloud anchor and the auxiliary plane anchor.

The plane detector 124 may generate the auxiliary plane anchor based on the predetermined number of specific frames, the cloud anchor pose, and the cloud anchor ID.

That is, the plane detector 124 may serve to infer a plane based on the predetermined number of specific frames, the cloud anchor pose, and the cloud anchor ID and convert the frame to be suitable for the shared AR coordinate system to store the plane in the form of the auxiliary plane anchor.

Here, the plane detector 124 may use PlaneRCNN, an NVIDIA model in 2018, to infer the plane information from a single image.

The plane detector 124 may infer plane information (a normal vector, a center coordinate, segmentation information) for each frame from the predetermined number of specific frames and replace it with a relationship with the cloud anchor using the cloud anchor pose.

Here, the plane detector 124 may utilize the normal vector and the center coordinate to combine the same planes on multiple images into one plane and store the plane as an auxiliary plane anchor.

The cloud anchor ID may include plane information of the surrounding environment acquired from the frame captured during a sharing process by the host as a plurality of auxiliary plane anchors. The auxiliary plane anchor is configured by information representing the plane on a shared AR coordinate system and the center position may be expressed by a conversion relationship matrix between the cloud anchor, the plane, and the center points.

When the synchronization of the AR coordinate system ends, the plane detector 124 may define the position of the virtual object by utilizing information from the auxiliary plane anchor.

Figure 2:
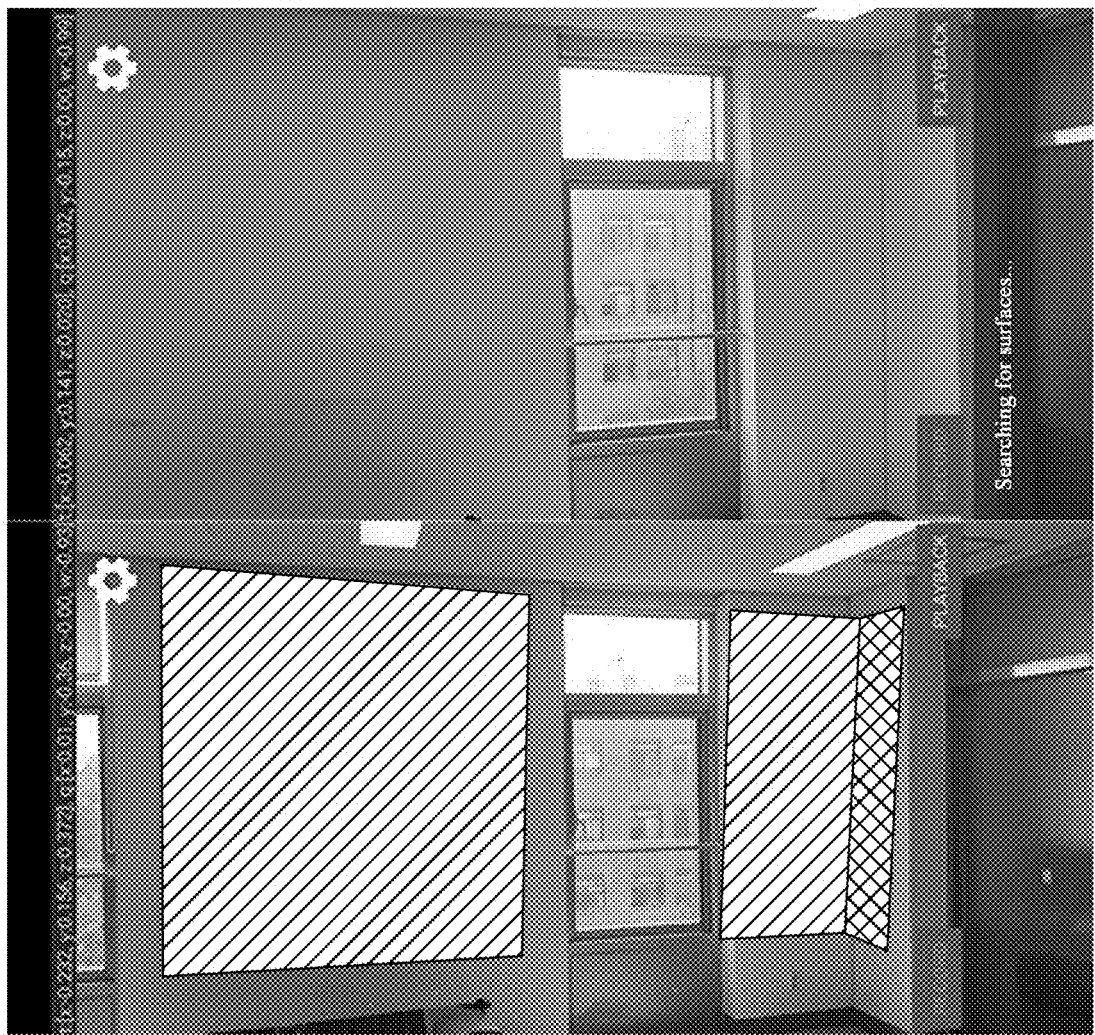
FIGS. 2 and 3 are views illustrating an application example of an AR share system according to an embodiment of the present disclosure.
Figure 3:
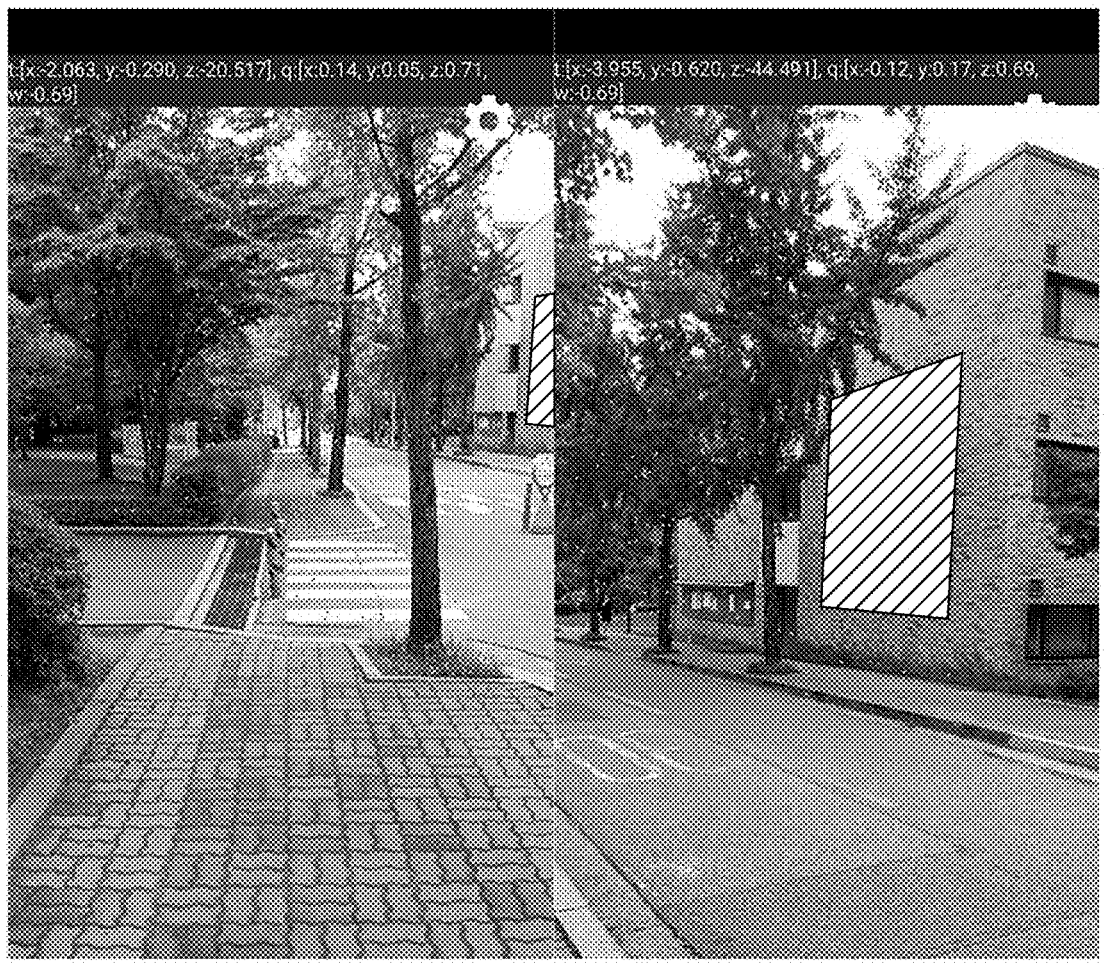

FIGS. 2 and 3 are views illustrating an application example of an AR share system according to an embodiment of the present disclosure.

FIGS. 2 and 3 may be a demonstration obtained by visualizing an auxiliary plane anchor to show an application example of the AR share system 100 indoors and outdoors.

First, in FIG. 2, red and blue rectangles are auxiliary plane anchors connected to the indoor cloud anchor, and virtual objects may be disposed in the corresponding region by utilizing the auxiliary plane anchor information.

FIG. 3 illustrates that a plane detector 124 of the server 120 is utilized even on the outside to utilize a plane at a distance that is not detected by the SLAM of the ARCore of the related art as an auxiliary plane anchor.

An object of the present disclosure is to provide an AR share system in which a spatial restriction of a virtual object is solved.

Further, another object of the present disclosure is to provide an AR share system which extends a positional space of a virtual object by means of a planar reasoning deep neural network and utilizes an auxiliary plane anchor to share a virtual object without degrading the QoS.

Further, another object of the present disclosure is to provide an AR share system in which a position estimation spatial restriction of SLAM is solved using the deep neural network and the auxiliary plane anchor concept.

According to the present disclosure, the AR share system has advantages in that a virtual object is shared under the spatial restriction and planar position information is reasoned by means of the deep neural network to share the virtual object in an extended space as compared with the related art.

According to the present disclosure, the AR share system has an advantage in that only a part of an auxiliary plane anchor generating process is included in the device so that the virtual object may be shared with a cost similar to the related art in view of a user (a host or a client).

Further, according to the present disclosure, it is advantageous in that the AR share system has a flexibility to change a mobile AR system and a planar reasoning deep network which are sub systems.

The effects of the present disclosure are not limited to the aforementioned effects, and various other effects are included within a range which is obvious to those skilled in the art from the following description.

The AR share system 100, device 110, AR system 112, image selector 114, server 120, database 122, and plane detector 124 in FIGS. 1-3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An augmented reality (AR) share system, comprising:
a device for sharing AR information, the device configured to select a predetermined number of specific frames, among a plurality of frames used for a registration process of a cloud anchor; and
a server configured to:
receive the predetermined number of specific frames selected by the device; and
generate an auxiliary plane anchor defining a position of a virtual object based on the predetermined number of specific frames selected by the device, wherein the device comprises:
an AR system configured to register a position of the cloud anchor for coordinate synchronization of the virtual object; and
an image selector configured to:
extract frames exceeding a number of set reference feature points, among the plurality of frames used to register the cloud anchor, based on feature point information set in the AR system; and
select the predetermined number of specific frames with a minimum ratio of feature points overlapping between the frames, among the plurality of frames, which is higher than a predetermined reference ratio, and
wherein the number of the set reference feature points and the minimum ratio of feature points comprise references for selecting images used for the AR share system to generate virtual objects.

2. The AR share system of claim 1, wherein, in response to the predetermined number of specific frames being transmitted, the image selector is further configured to transmit a cloud anchor pose of each of the predetermined number of specific frames and a cloud anchor identification (ID) to the server.

3. The AR share system of claim 2, wherein the server comprises:
   a database; and
   a plane detector configured to generate and store the auxiliary plane anchor in the database based on the predetermined number of specific frames, the cloud anchor pose, and the cloud anchor ID.

4. The AR share system of claim 3, wherein the plane detector is further configured to infer plane information for each frame from the predetermined number of specific frames, and update the information with the cloud anchor with the cloud anchor pose.

5. The AR share system of claim 4, wherein the plane detector is further configured to:
   infer a plane based on the predetermined number of specific frames, the cloud anchor pose, and the cloud anchor ID; and
   convert a frame to be suitable for a shared AR coordinate system to store the plane in a form of the auxiliary plane anchor.

* * * * *